United States Patent
Zhou (10) Patent No.: US 6,353,700 B1
(45) Date of Patent: *Mar. 5, 2002

(54) METHOD AND APPARATUS FOR PLAYING AN MPEG DATA FILE BACKWARD

(75) Inventor: Changguo Zhou, Cupertino, CA (US)

(73) Assignee: Womble Multimedia, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,012

(22) Filed: Apr. 7, 1998

(51) Int. Cl.$^7$ .............................. H04N 5/91; H04N 7/26
(52) U.S. Cl. ........................................ 386/68; 386/111
(58) Field of Search ........................... 386/68, 6–8, 33, 386/81–82, 111–112

(56) References Cited

U.S. PATENT DOCUMENTS

| | | | | |
|---|---|---|---|---|
| 5,621,464 A | * | 4/1997 | Teo et al. ................... | 348/715 |
| 5,799,129 A | * | 8/1998 | Muto ........................ | 386/111 |
| 5,974,224 A | * | 10/1999 | Nagata ....................... | 386/111 |
| 6,009,229 A | * | 12/1999 | Kawamura ................... | 386/68 |
| 6,009,231 A | * | 12/1999 | Aoki et al. .................. | 386/68 |
| 6,047,101 A | * | 4/2000 | Kawamura et al. ........... | 386/68 |

* cited by examiner

*Primary Examiner*—Wendy R. Garber
*Assistant Examiner*—Po-lin Chieu
(74) *Attorney, Agent, or Firm*—Joe Zheng (57) ABSTRACT

The present invention has been made in consideration of linear reverse playback of MPEG video data and has particular applications to video special effect editing. According to one aspect of the present invention, the disclosed system uses a minimum number of frame storage to buffer decompressed I and P frames so as to decompress B frames in a reverse order and subsequently display the B frames. Every time, it comes to display the decompressed I and P frames buffered in the frame storage, an I frame or a P frame in a group of picture (GOP) prior to current GOP is decompressed and buffered into one of the frame storage that becomes available when the content therein has been retrieved for display. The cyclic use of the frame storage and the time that would be otherwise spent for decompressing B frames guarantees a linear reverse playback of MPEG video data without showing retardant visual effects that often result from non-even decoding processes in displaying compressed frames.

19 Claims, 6 Drawing Sheets

METHOD AND APPARATUS FOR PLAYING AN MPEG DATA FILE BACKWARD

BACKGROUND OF THE INVENTION

1. Field of Invention

This invention relates generally to MPEG format video editing, and more particularly to a method and apparatus for playing an MPEG format video file backward.

2. Description of the Related Art

The term "video editing" is often used in two slightly different ways. Sometimes it refers to a process of selecting and re-recording just the good footage, eliminating the unwanted ones meanwhile the term is also used for the whole post-production process, including titling, special effects, reversing and etc. In the past, video editing requires expensive equipment and professional attainment in a high-budget production house. Nowadays, a video source often comes in a compressed digital format, which makes it possible for general users to perform video editing with relatively inexpensive personal computers.

Video sources are often in analog video formats including 8 mm, Hi-8, VHS, S-VHS and VHS C (a compact version of VHS). Video captured in analog format must be transferred into digital format and preferably compressed in order to be distributed, for example, over the Internet. Thus digital video editing, also called non-linear editing, uses many of the same principals used in a word processing in home computers, but with quite a few twists. For example, a general editing task may include a portion of one video being copied and inserted into another video or footage of animated graphics being added to enhance characterized subjects in another video. A special-effect editing task, however, requires editing applications or programs to be equipped with designated special effects, for example, slow motions, zoom in/out and etc. The end result is a video product that is much crisper, more to the point and much more comprehensive than was previously possible in regular video captures.

One of the special effect editing often required in many businesses wanting a professional look and quality in their promotional tapes, training tapes, and television commercials, is a reverse playback of an original footage. When the original footage is in analog format, video frames are consecutively arrayed and the reverse playback means to play the video frames backwards, one of the commonly seen features in a video cassette player. When the original footage is in compressed digital format, such as MPEG format, the video frames, however, are not consecutively arrayed and, as will be explained more below, the video frames in MPEG format are not the actual video frames that can be displayed on TV screens. The reverse playback of such MPEG compressed video frames is not simply to play the video frames backward as does in a video cassette player.

There are a few commercially available products in the market, which allows general users to play or edit the MPEG formatted video stream in their home personal computers, for example, XingMPEG Player, version 3.12 from Xing Technology Corporation in California, IfilmEdit, Ver 1.2.3 from Cinax Designs, Inc. in Canada and Video Clip MPEG from VITEC Multimedia Company in France. But none provides the utility of performing the reverse playback of an MPEG video footage and inserting the reversed footage into an editing video.

Similar to analog video editing, an MPEG video footage may be completely decoded and stored in a sequence of frame storage. The decoded video frames in the frame storage are then sequentially played backward. The approach, however, may only work for a very short footage. For a regular, even a couple of minutes footage, there would be a huge number of the frame storage to retain the sequence of decoded frames, which no desktop computers would be able to accommodate. There is thus a need for a generic solution for playing an MPEG format video file backward with the least amount of memory. Further, similar to the reverse playback in a video cassette player, the reverse playback of an MPEG format video file should be at a linear speed. Because each B frame in an MPEG format video file can be decompressed and displayed only when there are corresponding I and P frames available, the corresponding I and P frames would be thus displayed without being further decompressed. The reverse playback of the MPEG format video file may sometimes be at uneven frame rate, resulting in jittery visual effects. There thus a further need for a mechanism to distribute evenly the computations involved in displaying I, P and B frames without requiring additional memory such that the MPEG format video file could be played backward at a linear speed.

SUMMARY OF THE INVENTION

The present invention has been made in consideration of the above described problems and has particular applications to video special effect editing. According to one aspect of the present invention, the disclosed system includeds an MPEG decoder to decode an MPEG data file; a memory space including a first storage space, a second storage space and a third storage space. The first and the second storage spaces are respectively used to buffer a decompressed I and a decompressed P frame of a current data group. To minimize visual jitters, a processing time is allocated to decompress an I frame of a preceding data group, which is buffered in the third storage space before B frames of the current group are respectively decompressed in conjunction with the decompressed and buffered I and P frames of the current group.

Apart from all known methods, the process uses a minimum number of frame storage to buffer I frame and P frames while decoding B frames in a reverse order. Further to maintain a linear speed of the reverse play, as will be appreciated below, every frame is displayed after only one MPEG decoding process. A transitive frame from a previous GOP is decoded whenever the frames in the frame storage are retrieved for display. Thus the timing for each frame to be displayed is well controlled and the subsequent reverse playback will not have any jittery visual effects that are often resulted from traditional decoding processes prior to displaying a particular frame.

Accordingly, an important object of the present invention is to provide an method and apparatus for playing an MPEG data file backward with a linear speed and even decoding computation for each of the compressed frames. Other objects, together with the forgoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble data processing devices or systems. These process descriptions and representations are the means used by those experienced or skilled in the art to most effectively convey the substance of their work to others skilled in the art. The present invention is a method and apparatus for playing an MPEG data file backward in digital video editing systems. The method along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

Introduction to MPEG

MPEG (Moving Pictures Experts Group) is a group of people that meet under ISO (the International Standards Organization) to generate standards for digital video (sequences of images in time) and audio compression. In particular, they define a compressed bit stream, which implicitly defines a decompressor. The compression algorithms, however, are up to individual manufacturers, and that is where proprietary advantage is obtained within the scope of a publicly available international standard.

The MPEG compression process starts with a relatively low resolution video sequence (sometimes decimated from the original) of about 352 by 240 frames by 30 frames per second in US and 25 frames per second for most European countries, but original high (CD) quality audio. The images are in color, but converted to YUV space, and the two chrominance components (U and V) are decimated further to 176 by 120 pixels. The basic scheme is to predict motion from one frame to another frame in the temporal direction, and then to use DCTs (Discrete Cosine Transforms) to organize the redundancy in the spatial directions. The DCTs are performed on 8×8 blocks, and the motion prediction is done in the luminance (Y) component on 16×16 blocks. In other words, given the 16×16 block in the current frame being encoded, a close match to that block in a previous or future frame is computed. The DCT coefficients (of either the actual data, or the difference between this block and the close match) are quantized, which means the DCT coefficients are divided by some value to drop bits off the bottom end. Many of the coefficients often end up being zero. The quantization can change for every macroblock (a macroblock is 16×16 of Y and the corresponding 8×8's in both U and V). The results of all of this, which include the DCT coefficients, the motion prediction vectors, and the quantization parameters (and other stuff) is Huffinan coded using fixed tables. The DCT coefficients have a special Huffman table that is two-dimensional in that one code specifies a run-length of zeros and the non-zero values that end the run. Also, the motion prediction vectors and the DCT DC components are coded as well.

There are three types of encoded frames, I or intra frames, P or predicted frames and B (bidirectional) frames. I frames are simply a frame coded as a still image. P frames are predicted from the most recently reconstructed I or P frame. Each macroblock in a P frame can either come with a vector and difference DCT coefficients for a close match in the last I or P, or it can just be intracoded (like in the I frames) if there was no good match. B frames are predicted from the closest two I or P frames, one in the past and one in the future. The sequence of encoded frames usually appears like:

. . . IBBPBBIBBPBBIBBPBBIB . . .

where IBBPBB forms a group of picture (GOP), referred to as S(6, 3), meaning a GOP has 6 "frames" comprising a plurality of subGOP of 3 frames, e.g. IBB or PBB. In other words, this is based on a random access requirement that one needs a starting point at least once every 0.2 seconds or so. It is known there are S(12, 3), S(15, 4) and other GOPs depending on the compressing requirement and television video format in use.

Figure 1:
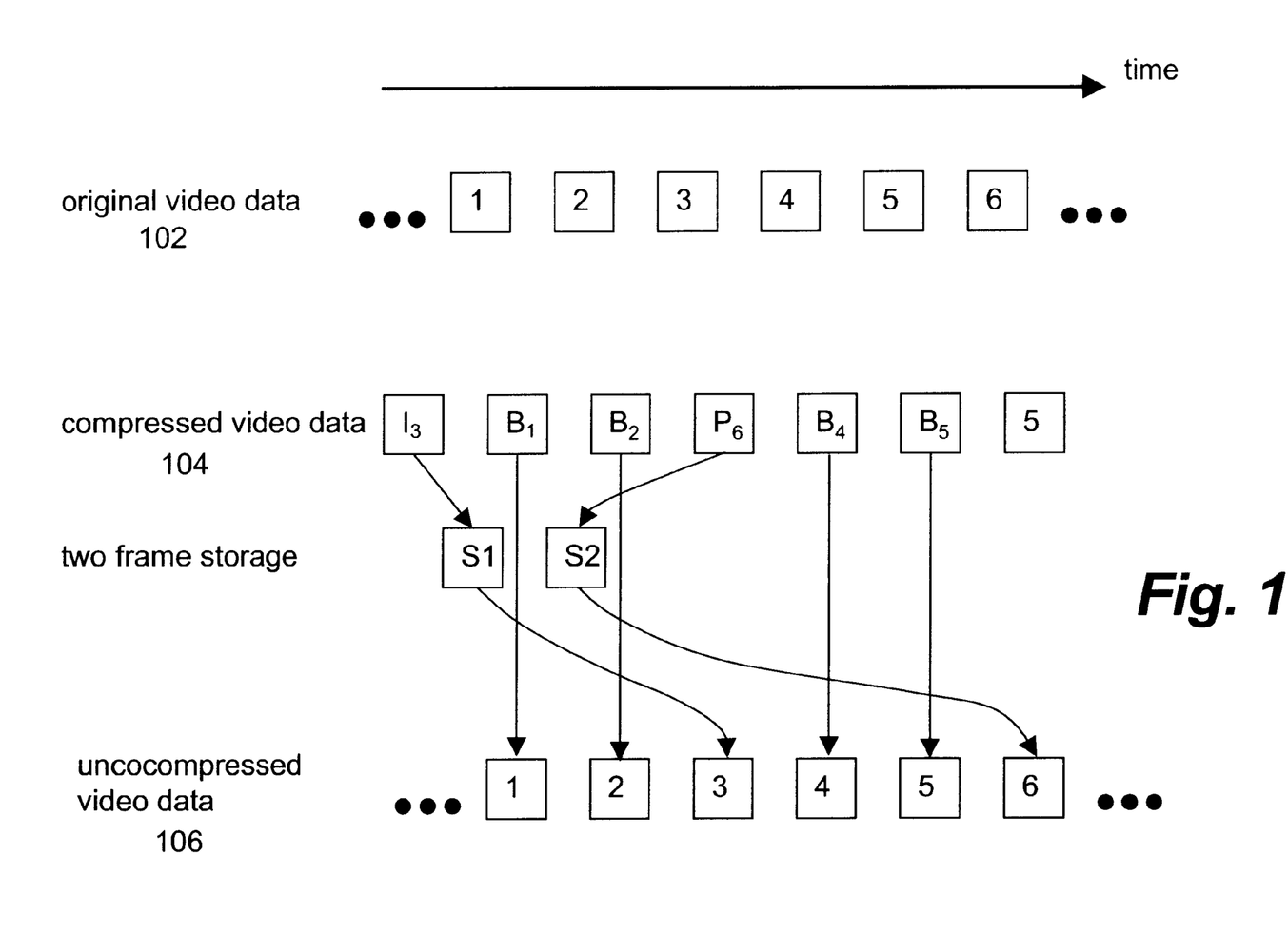
FIG. 1 demonstrates how an MPEG data file is decoded.

FIG. 1 shows the MPEG decoding (decompressing) process. Original video data 102 is a sequence of S(6,3) GOP, its corresponding MPEG compressed data 104 is being decompressed using two frame storage S1 and S2. As is described, only the I frame can be decompressed independently and the rest of the frame in a GOP is dependent on the decompressed I frame. Therefore the decompressed I frame must be buffered in S1. Similarly to decompress B frames, the corresponding P frame must be decompressed and available. S2 is used to buffer the decompressed P frame. With the decompressed I and P frames buffered in S1 and S2, all the B frames can be sequentially decompressed and then displayed.

A brief description on MPEG is provided herein to facilitate the description of the present invention, MPEG including popular MPEG-1, MPEG-2, MPEG-4 and MPEG-7, however, are not inherent limitations of the present invention. It will be appreciated to those skilled in the art that the disclosed invention can be used with other standardized compressed video formats as well.

The Preferred Embodiment

Figure 2:
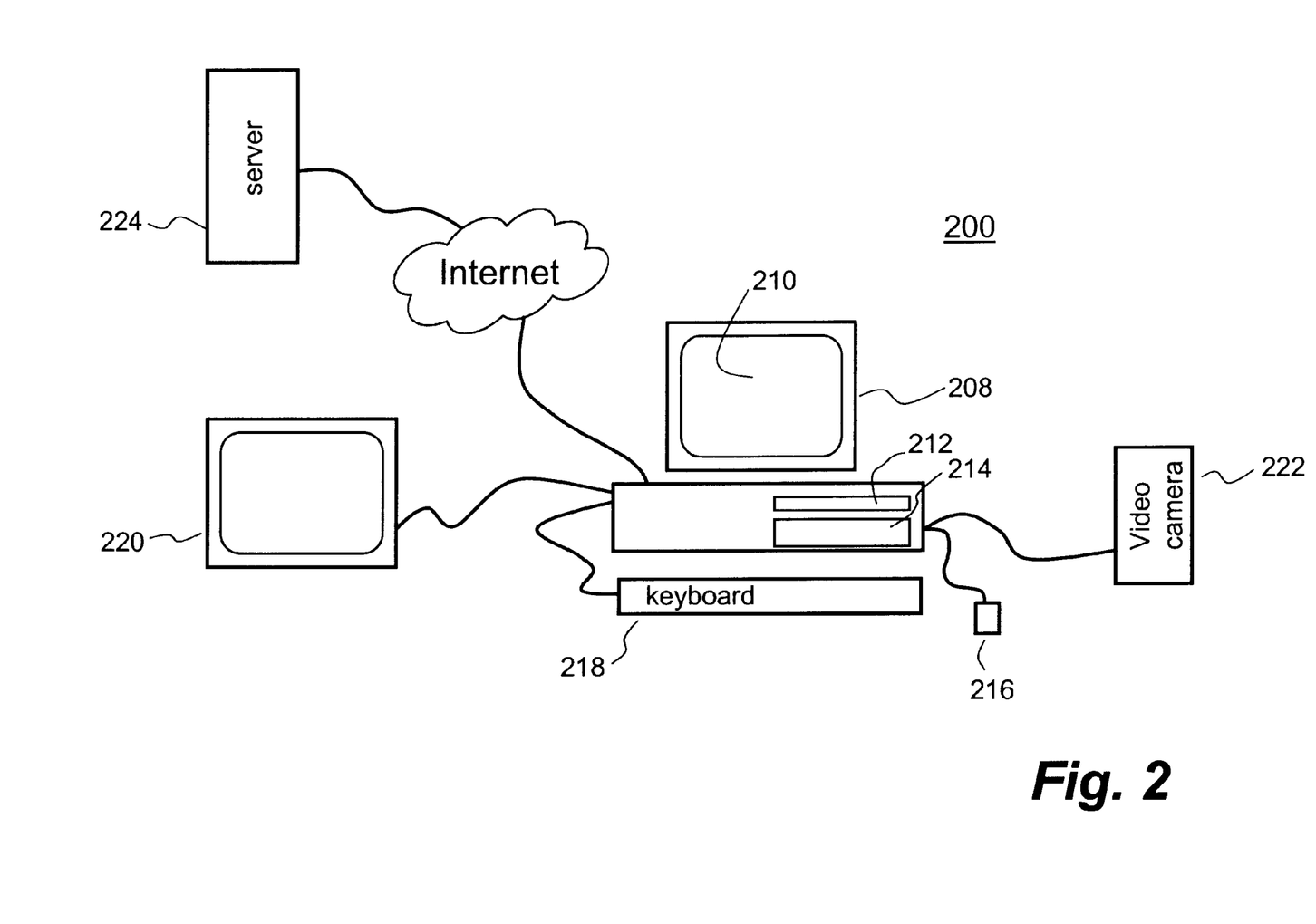
FIG. 2 shows one of the configuration systems in which the present invention may be practiced.

Referring now to the drawings, in which like numerals refer to like parts throughout the several views, FIG. 2 shows a schematic representation of one of configuration systems in which the present invention may be practiced. Shown in FIG. 2 is a computing device 200 which may be an IBM PC or PC-compatible computer operating under a window operating system, for example, Microsoft Windows 95. Computing device 200 is provided with a display monitor 208 having a display screen 210 on which computing device 200 displays video frames or images to users. Computing device 200 is further provided with a floppy disk drive 212 with which removable floppy disk media may be read or written, fixed disk drive 214 for storing data file and application program files, a keyboard 218 for permitting input of text data, such as titles and names of video data files, and a pointing device 216 such as a mouse or the like which is also provided to permit execution of commands, for example, to play the video data files on display screen 210. A conventional television set 220 is sometimes provided for viewing edited video data files. As one of the video sources, a conventional video camera 222 is provided for video capture. Video capture refers to a method of capturing full motion frames or images using a video camcorder. Video captured in an analog format must be transferred into digital format (digital video) and, preferably, MPEG compressed.

It is known to those skilled in the art that there are many ways to digitize the analog video to the digital video. One way is to connect conventional video camera 222 to a commercially available video digitizing board that outputs a compressed video file in MPEG format.

Also provided are connections to a network server 224 via the Internet for sending and receiving video data as well as other files such as files which include program instruction sequences by which computing device 200 is operated. It is generally understood that the computing device 200 includes a microprocessor and a working memory having sufficient capacity to store, for example, three to five video frames and other applications. Along with other applications and the window operating system, compiled and linked processes of the disclosed system in the present invention are loaded, preferably, in the working memory. In accordance with instructions from a user, and under control of the window operating system, the compiled and linked processes of the disclosed system are selectively activated to process and to manipulate the MPEG compressed video data. Also in accordance with the user's instructions, and based on the stored applications and the like, commands are issued to read in video images from video camera 222 or download the MPEG compressed video data from server 224 in a remote place via the Internet, to display video images on monitor 210 or TV 220, as described more fully herein below.

Figure 3:
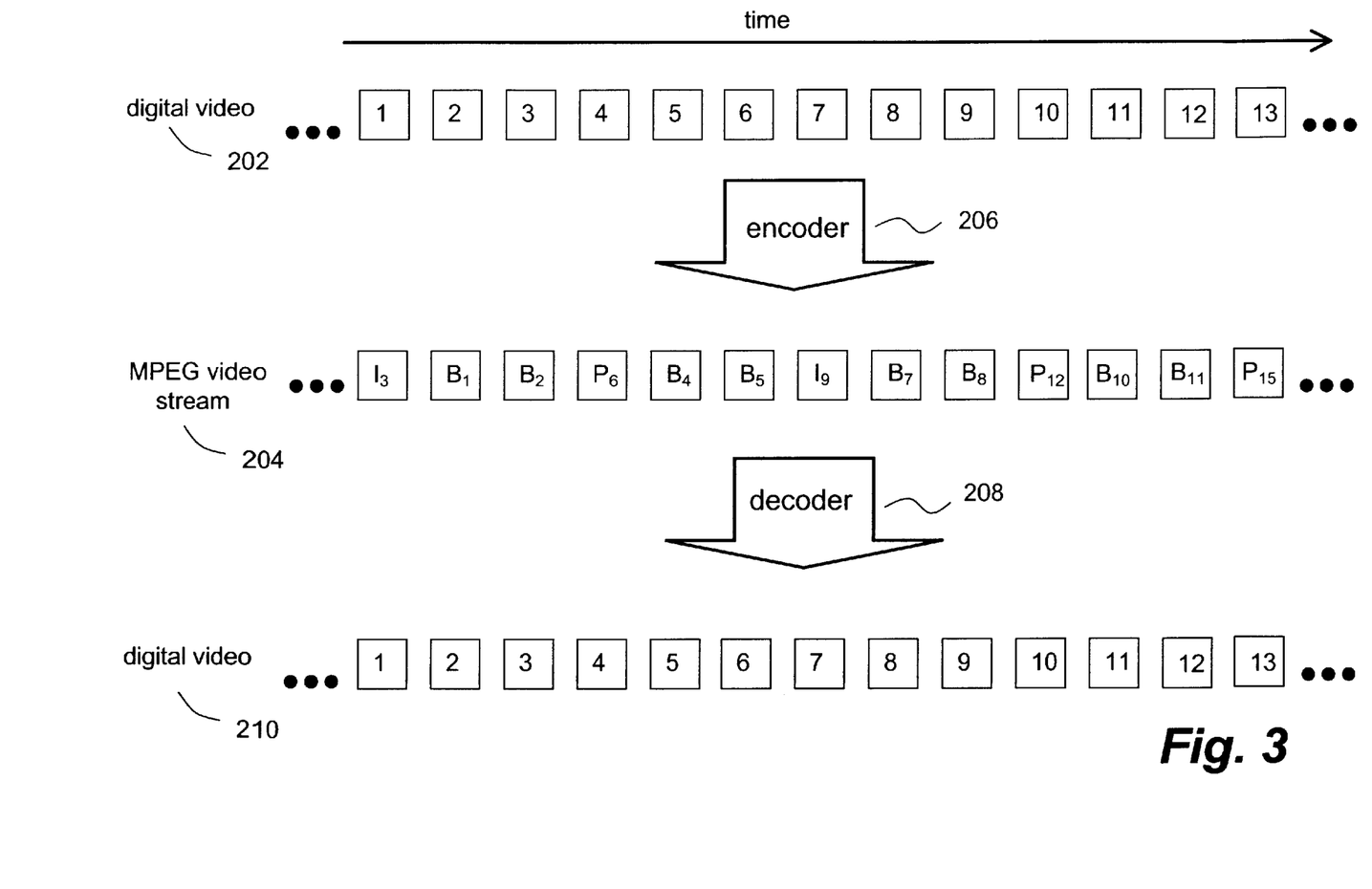
FIG. 3 illustrates an example of a digital video and the corresponding MPEG data file thereof used herein to describe the present invention.

Referring now to FIG. 3, there is shown an example of a digital video and the corresponding MPEG video data thereof used in describing the disclosed system. Digital video 202 comprises a sequence of frames; each frame is displayable. As is known in the art, the sequence of frames must be successively displayed at a rate of 30 frames per second to preserve the motion effects visually in USA for example MPEG video data 204 is a compressed version of digital video 202 through an encoder 206 and the file size thereof is much smaller than digital video 202, which makes it possible for distribution through the Internet or media disks. It is understood that the "frames" in MPEG video data 204 are no longer displayable and the sequence thereof is not ordered in respect to the original sequence in digital video 202 as shown in the figure. To be more specific, in digital video 202, the sequence of frames 1, 2, 3, . . . , 12 corresponds, respectively, to $I_3B_1B_2P_6B_4B_5I_9B_7B_8P_{12}B_{10}B_{11}$. MPEG video data 204 show typical S(N, m) GOP, where N means the number of the compressed frame in a group led by I frame and m means the number of frames in the subGOP, hence N=6 and m=3, or S(6, 3) for MPEG video data 204 in the figure.

Decoder 208, which can be a software module or process loaded in computing device 200 or a separate apparatus that takes in and decompresses MPEG video data 204 and subsequently outputs decompressed digital video 210. Ideally decompressed digital video 210 should be identical to digital video 202 but in reality is visually equivalent to digital video 202. Each of the frames in decompressed digital video 210, like that in digital video 202, is now displayable.

Figure 4:
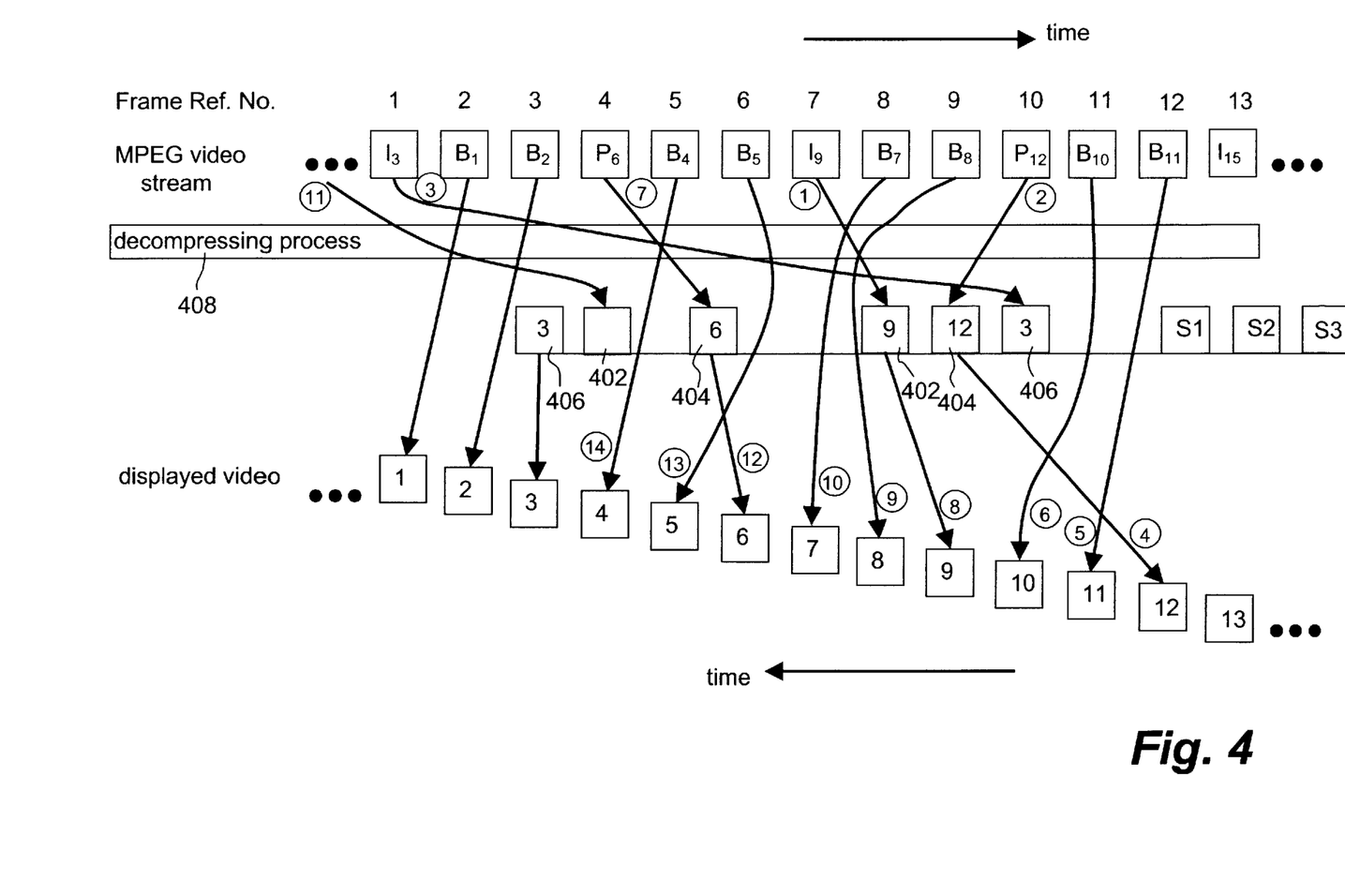
FIG. 4 demonstrates steps in the reverse playback of the MPEG data file of FIG. 3 while the MPEG data file is being decompressed with a linear operation using a minimum number of frame storage.

Referring now to FIG. 4, there is shown the process of linearly reverse playback of MPEG video data 204 through an MPEG decoding according to one embodiment of the present invention. As described before, upon receiving a sequence of MPEG video data, frames with high sequence number in the original digital video is displayed first while being decoded. For exemplary digital video 202;

frames . . . 1, 2, 3, 4, 5, 6, 7, 8, 9, 10, 11, 12, 13, . . . are successively displayed in the order of:
. . . 13, 12, 11, 10, 9, 8, 7, 6, 5, 4, 3, 2, 1, . . . from the corresponding MPEG video data 204 as:
. . . $I_3$ $B_1$ $B_2$ $P_6$ $B_4$ $B_5$ $I_9$ $B_7$ $B_8$ $P_{12}$ $B_{10}$ $B_{11}$ . . .

Apart from all known methods, the process uses a minimum number of frame storage to buffer I frame and P frames while decoding B frames in a reverse order. Further to maintain a linear speed of the reverse play, as will be appreciated below, every frame is displayed after only one MPEG decoding process. A transitive frame from a previous GOP is decoded whenever the frames in the frame storage are retrieved for display. Thus the timing for each frame to be displayed is well controlled and the subsequent reverse playback will not have any jittery visual effects that often result from traditional decoding processes prior to displaying a particular frame.

For MPEG video data 204 that is a sequence of S(6, 3) GOP, three frame storage 402, 404, and 406 are used. To facilitate the description of the present invention with MPEG video data 204, it is assumed that the reverse playback starts at frame 12. In other words, frame 12 has to be decompressed from $P_{12}$ through decompressing process 408 for display. For a demonstrative purpose, decompressing process 408, which can be an MPEG decoder or decoding process, is illustrated in the figure as a necessary process that each of the compressed frames in MPEG video data 204 must go therethrough to be decompressed.

As described before, to decompress $P_{12}$, $I_9$, which is the I-frame in the S(6, 3) group comprising $I_9$ $B_7$ $B_8$ $P_{12}$ $B_{10}$ $B_{11}$, must be decompressed first as step 1. The decompressed result is temporarily buffed in frame storage 402. With the buffered frame decompressed from the I-frame in the S(6, 3) GOP, $P_{12}$ can now be decompressed as step 2 and the result is again temporarily buffered in frame storage 404. With two buffered frames decompressed from $I_9$ and $P_{12}$ in the S(6, 3) group, two B-frame, $B_{10}$ and $B_{11}$, can be decompressed and immediately displayed. To maintain a linear speed in the reverse playback of MPEG video data 204 and before frame 12 from frame storage 404 is displayed, $I_3$ is decompressed and buffered in frame storage 406 as step 3. A frame, that is advanced to be decompressed, is referred to as a transitive frame. The advancement of decompressing a transitive frame is one of the important features in the disclosed system. Now with three buffered frames respectively in frame storage 402, 404 and 406, the reverse play is ready.

Figure 5:
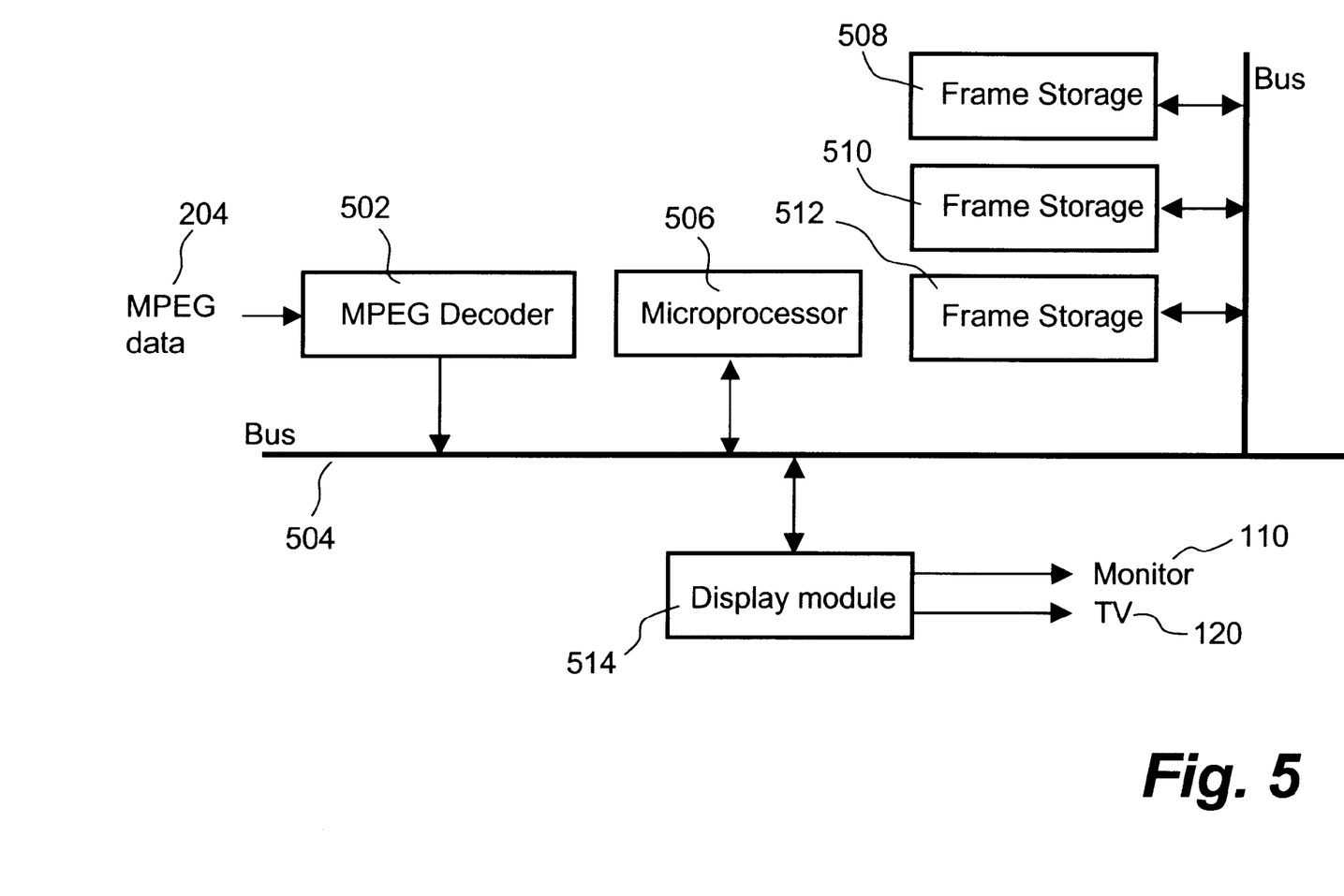
FIG. 5 shows an internal block diagram in one of the configuration systems in which the disclosed system is implemented therein.

To further understand the disclosed system and facilitate the description of the reverse playback of MPEG video data 204 with respect to one embodiment, FIG. 5 shows functional blocks with which the present invention is implemented. As understood by those skilled in the art, each of the blocks can be respectively implemented in computing device 100 of FIG. 1 or constructed using commercially available components assembled in a separate board capable of communication with a PC bus 504 in computing device 100. MPEG decoder 502, performing decompressing process 408 in FIG. 4, can be obtained from the public domain available in the Internet or commercially from Silicon Graphics Incorporated in Mountain View, Calif. Microprocessor 506 controls the operations of bus 504, guiding signal flows from one block to another. MPEG decoder 502 receives MPEG video data 204 that, preferably, comes in a reverse order, namely, the last frame in MPEG data 204 comes in first. Under the control of microprocessor 506, MPEG decoder 502 decompresses, as described above, $I_9$, $P_{12}$, and $P_6$, and keeps the decompressed frames, respectively, in frame storage 508, 510, and 512. Display module 514 is a display utility that takes decompressed video frames and generates either a VGA signal or a regular TV signal that causes monitor 110 or TV 120 to display the video frames.

Returning to FIG. 4, $B_{10}$ and $B_{11}$ can be decompressed with reference to the decompressed $I_9$ and $P_{12}$ frames and the decompressed versions thereof can be directly sent to display module 514 for display as steps 5 and 6, respectively. According to the frame sequence, the next frame to be displayed is frame 9 whose data is now available in frame storage 402. Again to maintain the linear speed of the playback and utilize the time that would be otherwise spent for decompressing process for B frames, $P_6$ is decompressed and buffered in frame storage 404 as step 7. It is understood to those skilled in the art that the content in frame storage 404 is no longer needed once $B_{10}$ and $B_{11}$ are decompressed, hence frame storage 404 is available for buffering the new decompressed frame. With $I_3$ from the S(6, 3) GOP comprising $I_3$ $B_1$ $B_2$ $P_6$ $B_4$ $B_5$ now available in frame storage 406, $P_6$ can be decompressed with reference to the decompressed $I_3$ in storage 406. Upon decompressing $P_6$, the content in frame storage 402 is retrieved for display as step 8.

Now with the decompressed $P_6$ in frame storage 404 and the decompressed $I_9$ in frame storage 402, $B_8$ and $B_7$ can be decompressed and displayed as steps 9 and 10. Accordingly, the next frame to be displayed is the content in frame storage 404, again to maintain the linear speed of the playback and utilize the time that would be otherwise spent for decompressing B frames, frame storage 402 is now available for another decompressed frame. In this example, an I frame in a S(6, 3), not shown in the figure, preceding the S(6, 3) GOP comprising $I_3$ $B_1$ $B_2$ $P_6$ $B_4$ $B_5$ $P_6$, is to be decompressed and the decompressed version thereof is buffered in frame storage 402 as step 11.

The content, namely decompressed $P_6$ in frame storage 404 is retrieved for display as step 12. Further $B_5$ and $B_4$ can be decompressed with reference to the decompressed $I_3$ and $P_6$ buffered respectively in frame storage 404 and 406 as steps 13 and 14. As illustrated in the figure, the process is literally repeated as described above. In order words, every time it comes to display the content in one of the frame storage, another one of the frame storage becomes available to hold a either I frame or a P frame positioned before current GOP. To use the time that would be otherwise spent for decompressing B frames, the prior frames are decompressed in advance such that when it comes to decompress corresponding B frames, the decompressed I and P frames are ready for reference.

It can be generally concluded that for an MPEG video data file comprising at least two S(N, m) GOPs, there require at least 2(N/m)–1 frame storage to buffer decompressed I and P frames. For example, MPEG video date 204 in FIG. 4 shows a sequence of S(6, 3) GOPs, hence three frame storage are used therein.

Figure 6:
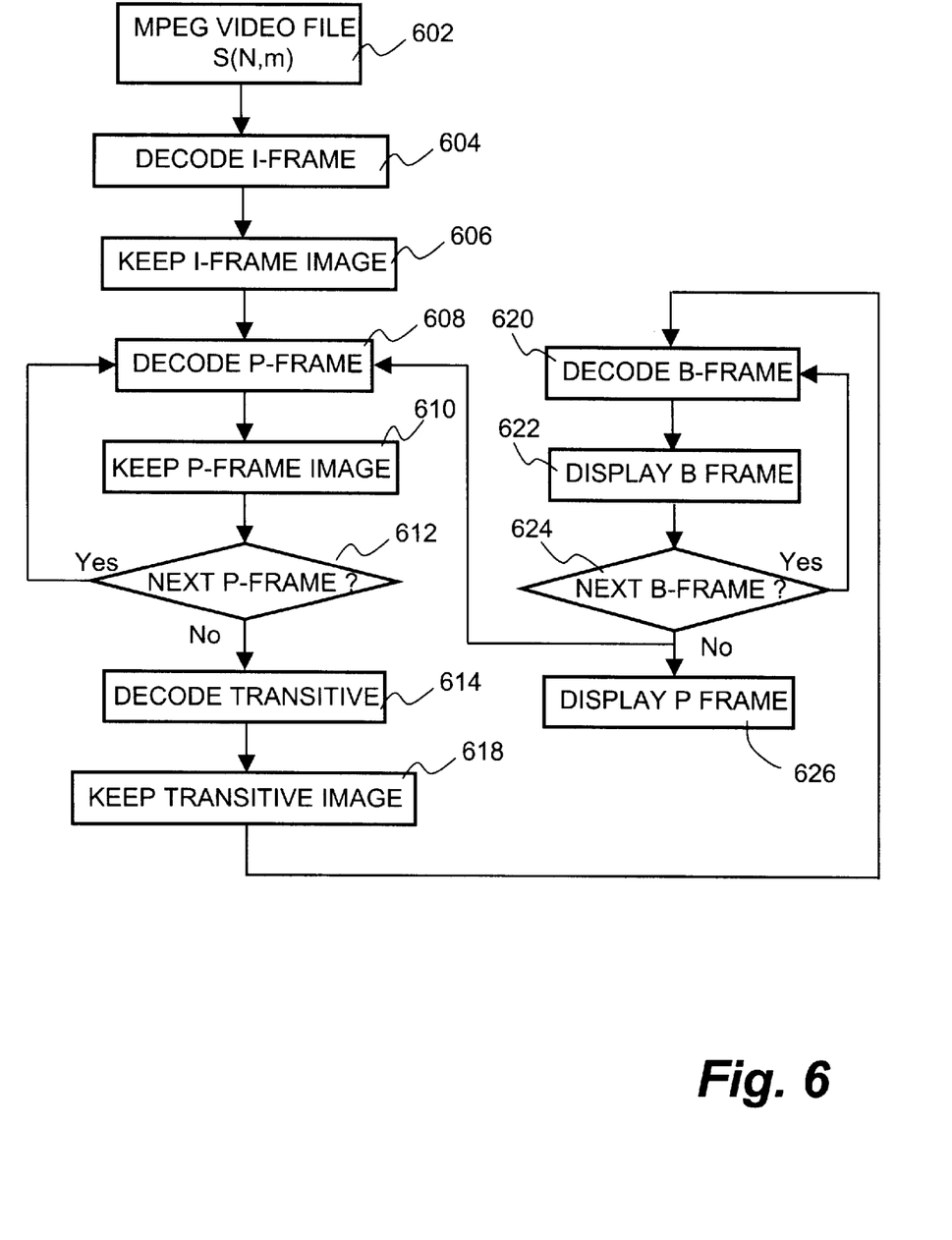
FIG. 6 shows a process flowchart of the disclosed system according to one embodiments thereof.

FIG. 6 shows a process flowchart 600 with respect to one embodiment of the present invention. At 602, an MPEG video file with S(N, m) is provided for reverse playback. According to the format, the minimum number of frame storage is calculated as follows:

$$2\left(\frac{N}{m}\right) - 1$$

In other words, for example, there would be a minimum of 5 frame storage if the MPEG video file comprises a sequence of S(12, 4) GOPs.

As described above, the last GOP in the MPEG video file is to be decompressed for display first. Accordingly, the I frame in the last GOP is decoded or decompressed using an MPEG decoder or process at 604 and the decompressed version is stored in one of the frame storage at 606. With respect to the decompressed I frame in one of the frame storage, the rest of the P frames are sequentially decompressed using the same MPEG decoder at 608 and respectively stored in the rest of available frame storage at 610 and 612. According to the minimum number of the frame storage used to playback the MPEG video file in a reverse order, there is one more frame storage available. At 614, a transitive frame, preferably the I frame in the GOP prior to the current GOP in the MPEG video file, is advanced to be decompressed and the decompressed version is kept in the last available frame storage before the playback starts. Now with the decompressed I frame and all the P frames in the frame storage, all the B frames in the current GOP can be sequentially and respectively decompressed and displayed at 620, 622 and 624. The detail of decompressing has been described before. However, it is appreciated by now to those skilled in the art that one of the decompressed P frames becomes purposeless as soon as the decompressed P frame in one of the frame storage is retrieved for display at 626. Thus leaves one frame storage available for a P frame in the prior GOP. Thus a first P frame in the prior GOP is decompressed at 608 and the decompressed version thereof is buffered into the available frame storage meanwhile a P frame in the current GOP is turned for display at 626. As the B frames are successively decompressed with respect to the I frame and P frames in the current GOP, the P frames in the prior GOP are orderly decompressed and the decompressed versions successively take over the frame storage that become available when the P frames in the current GOB are turned for display. Eventually by the time all the frames in the current GOP are successively displayed, the I frame and P frames in the prior GOP have been ready in the frame storage for decompressing and displaying all the B frames.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of one embodiment.

What is claimed is:

1. A method for playing an MPEG data file in a reverse order, said method comprising:

receiving said MPEG data file including at least a first group and a second group, each group comprising an I frame, a P frame and a plurality of B frames, wherein said first group is ahead of said second group in a normal order;

decompressing said I frame in said second group using an MPEG decoder;

buffering said decompressed I frame from said second group in a first frame buffer;

decompressing said P frame in said second group, using said MPEG decoder, with reference to said decompressed I frame in said first frame buffer;

buffering said decompressed P frame from said second group in a second frame buffer;

decompressing said I frame from said first group as a transitive frame using said MPEG decoder without decompressing said B frames from said second group; and buffering said decompressed transitive frame in a third frame buffer.

2. The method as recited in claim 1 further comprising starting a playback of said MPEG data file by displaying a first video frame that is reconstructed from said second group.

3. The method as recited in claim 2, wherein said first video frame is one of said decompressed I frame from said second group in said first frame buffer and P frame from said second group in said second frame.

4. The method as recited in claim 2, wherein said first video frame corresponds to a last B frame of said B frames in said second group in conjunction with said decompressed I frame and P frame from said second group in said first and second frame buffers.

5. The method as recited in claim 2, wherein said starting playback of said MPEG data file by displaying said first video frame comprises:

decompressing said B frames successively, in said reverse order, with reference to said decompressed I frame in said first frame buffer and said decompressed P frame in said second frame buffer; and displaying successively said decompressed B frames in said reserve order.

6. The method as recited in claim 5, said first video frame is one of said decompressed B frames.

7. The method as recited in claim 6, said method further comprising:

rebuffering said second frame storage by decompressing said P frame in said first group with reference to said decompressed transitive frame in said third frame buffer; and keeping said decompressed P frame from said first group in said second frame buffer when said decompressed I frame from said second group in said first frame buffer is retrieved for display.

8. An apparatus for playing an MPEG date file in a reverse order, said apparatus comprising:

an MPEG decoder;

means for receiving said MPEG data file including at least a first group and a second group, each group comprising an I frame, at least one P frame and a plurality of B frames, wherein said first group is ahead of said second group in a normal order;

a first frame buffer buffering a first frame decompressed by said MPEG decoder from said I frame in said second group;

a second frame buffer buffering a second frame decompressed by said MPEG decoder from said P frame in said second group; and a third frame buffer buffering a third frame decompressed by said MPEG decoder from said I frame in said first group prior to decompressing said B frames from said second group.

9. The apparatus as recited in claim 8 wherein said second frame buffer is updated with said second frame decompressed by said MPEG decoder from said P frame in said first group when said first frame in said first frame buffer is retrieved for display.

10. A method for playing an MPEG data file backward, said method comprising:

receiving said MPEG data file comprising at least a first and a second group of pictures, said first group coming ahead of said second groups, each of said first and second groups comprising an I frame, at least one P frames and a plurality of B frames;

decompressing said I frame in said first group using said MPEG decoder without decompressing said B frame from said second group;

buffering said decompressed I frame from said second group in first frame storage;

decompressing said P frames in said second group, using said MPEG decoder, with reference to said decompressed I frame in said first frame storage;

buffering said decompressed P frames in second frame storage;

decompressing said I frame in said first group using said MPEG decoder; and buffering said decompressed I frame from said first group in third frame storage.

11. The method recited in claim 10 further comprising:

displaying one of said decompressed P frames from said second group in said second frame storage; and decompressing successively and respectively said B frames in said second group using said MPEG decoder in a reverse order, with reference to said decompressed I frame in said first frame storage and said decompressed P frames in said second frame storage.

12. The method recited in claim 11, wherein said displaying one of said decompressed P frames in said second group comprises:

decompressing one of said P frames in said first group; and buffering said decompressed one of said P frames from said first group in said second frame storage that becomes available when one of said decompressed P frames from said second group in said said second frame storage is retrieved for display.

13. The method recited in claim 12, said method further comprising:

displaying said I frame from said second group in said first frame storage.

14. The method recited in claim 13, wherein said displaying said I frame from said second group in said first frame storage comprises:

decompressing another of said P frames in said first group; and buffering said decompressed another of said P frames from said first group in said second frame storage that becomes available when one of said decompressed P frames from said second group in said second frame storage is retrieved for display.

15. An apparatus for playing an MPEG data file in a reverse order, said apparatus comprising:

an MPEG decoder;

means for receiving said MPEG data file including at least first and second S(N, m) groups of data, each of said S(N, m) groups comprising an I frame, a number of P frames and a plurality of B frames, wherein said first S(N, m) group comes ahead of said second S(N, m) group in a normal order, and wherein S(N, m) represents a group of data, N represents a number of frames and m represents a number of a sub-group therein;

first frame storage buffering a first frame decompressed by said MPEG decoder from said I frame in said second S(N, m) group;

second frame storage having memory spaces sufficiently to accommodate said number of P frames, each buffering one of second frames decompressed respectively by said MPEG decoder from one of P frames with respect to said first frame in said first frame storage; and third frame storage buffering a third frame decompressed by said MPEG decoder from said I frame in said first S(N, m) group prior to decompressing said B frames from said second group.

16. The apparatus as recited in claim 15, wherein said number is determined by 2(N/m)−1.

17. The apparatus as recited in claim 16, wherein said first frame storage is updated with another one of said second frames decompressed by said MPEG decoder from said another one of said second S(N, m) group when said one of said second frames in said second frame storage is retrieved for display.

18. An apparatus for playing an MPEG data file in a reverse order, the apparatus comprising:

an MPEG decoder suitable for decoding the MPEG date file including at least a first and a second groups of data, wherein the first group is ahead of the second group in a normal order and each has a set of first data, at least one set of second data and a number of sets of third data;

a memory for storing code as an application;

a processor, coupled to the memory and the MPEG decoder, executing the code to cause the application to perform operations of:

reading the second group ahead of the first group;

decompressing the first data of the second group and storing the decompressed first data in a first memory space;

decompressing the second date in conjunction with the decompressed first data and storing the decompressed second data in a second memory space; and decompressing the first data of the first group and storing the decompressed first data of the first group before the sets of third data are respectively decompressed in conjunction with the decompressed first and second data of the second group.

19. The apparatus of claim 18, wherein the first data is for an intra frame (I), the second data is for a predicated frame (P), and each of the sets of third data is for a bidirectional frame (B).

* * * * *